July 30, 1935.   F. MIEDER   2,009,559
SAND SETTLING PLANT
Filed Aug. 20, 1932
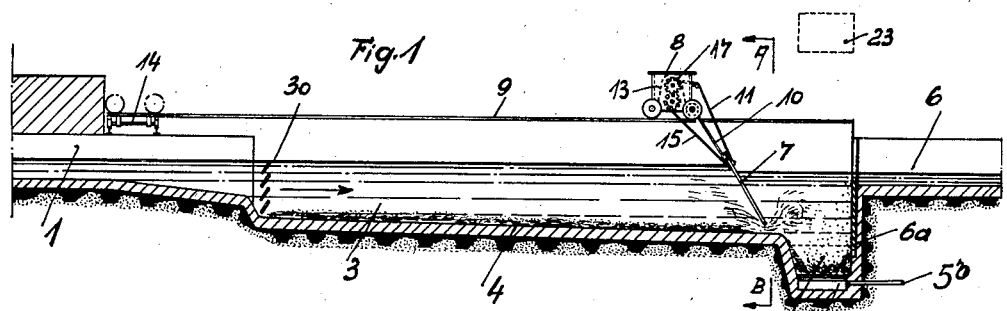
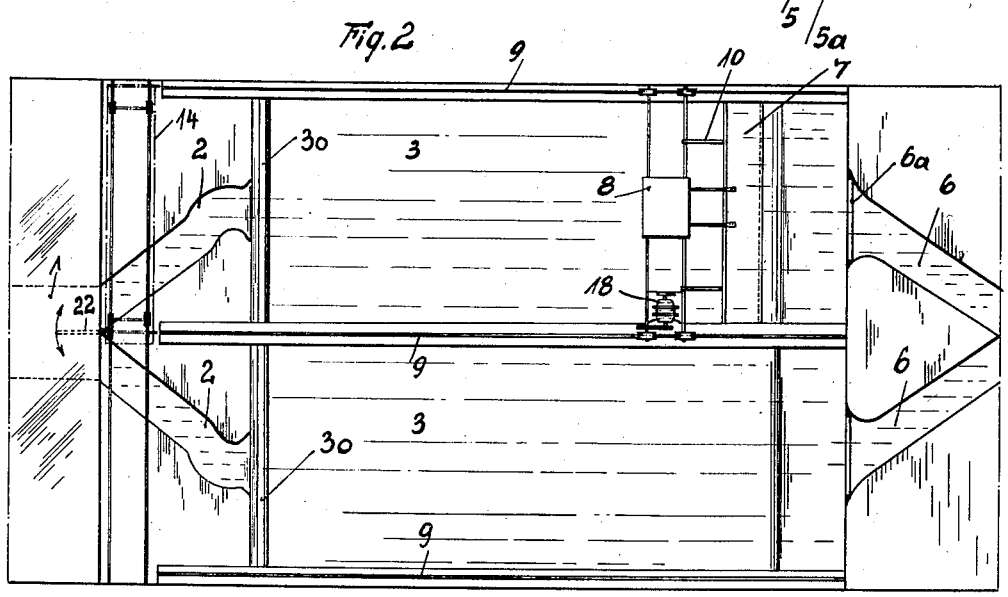
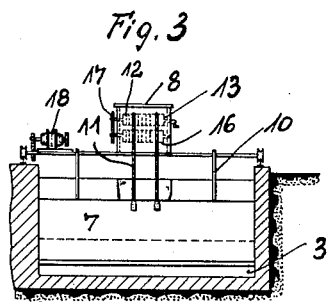 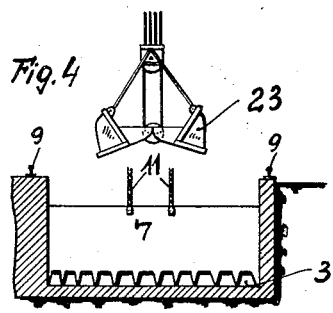
INVENTOR Patented July 30, 1935

2,009,559

UNITED STATES PATENT OFFICE 2,009,559

SAND SETTLING PLANT

Fritz Mieder, Leipzig, Germany

Application August 20, 1932, Serial No. 629,679
In Germany August 28, 1931

5 Claims. (Cl. 209—208)

This invention relates to a sand settling plant in clarifying works for waste water.

The plant according to the invention comprises in the main a basin provided with supply and outlet channels, a collecting reservoir or sink-hole disposed on the bottom of the basin at the end thereof, and a water-retaining wall inserted in the basin and corresponding in width and shape to the cross section thereof except for a narrow slit at the bottom of the basin. The water dammed up by the retaining wall rushes through this slit at high speed and in so doing entrains the sand that has settled on the floor of the basin from the water flowing through the latter and carries it away towards the end of the basin, the sand being simultaneously rinsed thoroughly and thus freed from particles of organic matter that might be contained therein. The retaining-wall can be rearranged from time to time or gradually carried along by the water flowing through the basin, though it is preferably slowly moved in a direction opposite to the direction of flow of the waste water to increase the latter's velocity when passing through the slit. When the retaining-wall is to be moved this way, it has been found to be particularly advantageous to arrange it obliquely to the bottom of the basin and with the top edge leading in the direction of motion of the wall. The retaining-wall is preferably mounted on a carriage capable of moving on the side walls of the settling basin and can be completely removed therefrom for transfer to an adjacent basin by means of a traveling platform.

By way of example, one form of the settling basin and of the device required for rinsing and removing the sand during operation is illustrated in the accompanying drawing, in which Figure 1 is a longitudinal section of the settling basin provided with a retaining-wall and carriage for same;

Fig. 2 is a top view of Fig. 1;

Fig. 3 is a cross section on the line A—B, of Fig. 1; and

Fig. 4 is a cross section on the line C—D, of Fig. 1.

Referring to the drawing, 1 is the covered supply channel for the waste water, which is divided into the two open grooves 2 each of which opens into a sand settling basin 3 whose bottom 4 extends into a depression or sink-hole 5 and preferably slopes from the inlet down to the outlet. The walls of the basin 3 are in vertical position. 6 is the joint outlet channel for both basins 3 which may be operated jointly or singly and which considerably exceed the supply and outlet channels in width and depth so as to appreciably reduce the velocity of the water flowing through them and thus cause the sand to be separated from the water and settle on the bottom. A distributor 30 having the shape of a blind is provided at the inlet of each basin 3 to insure uniform flow of the water therein.

A retaining-wall 7 inserted in one of the basins 3 takes up the entire cross section thereof with the exception of a slit between its lower edge and the bottom of the basin. As Fig. 4 shows, the lower edge 21 of the wall 7 may have the form of a rake the teeth of which rest on the bottom of the basin and permanently determine the height of the slit. The water passing through the basin 3 necessarily has to flow through the small slit between the lower edge of the wall 7 and the bottom 4, so that its velocity and force will be much greater at this point than elsewhere in the basin 3, and it is due to this increased velocity and force that the sand deposited on the bottom 4 will be whirled up and carried away to the end of the basin 3. In order to remove the sand from all parts of the bottom 4 the retaining-wall 7 is displaced from time to time or it may be made movable and permitted to drift slowly from the inlet to the outlet of the basin 3 with the flow of the water. A still better arrangement, however, is to provide for positive motion of the wall 7 in a direction opposite to that of the flow of the water and thereby increase the velocity and force of the water flowing through the slit to a very considerable degree. In this case, the wall 7 is preferably inserted in the basin 3 so that its lower edge leads relative to its upper edge in the direction of flow of the water.

The retaining-wall 7 is moved from one end of the basin 3 to the other by a carriage 8 which travels on the rails 9 disposed on the side walls of the basin 3. The wall 7 is secured to the carriers 10 movably connected with their ends to the carriage 8. One side of the wall 7 is engaged by the wire ropes 11 the free ends of which are fastened onto the drum 12 of a winch 13 disposed in the carriage 8. The ropes 11 serve for adjusting the size of the slit or gap according to the height of the accumulated sand and also for lifting the wall 7 out of the basin 3, so that the carriage 8 of the wall 7 may be moved to an adjacent basin by means of the travelling platform 14. To prevent the wall 7 disposed oscillatorily so to speak on the carriage 8 from being lifted out by the flow of the water, additional wire ropes 15 engage the other side of the wall 7 and can be wound up on a drum 16 in the carriage 8, the drums 12 and 16 being preferably brought into engagement by means of the cogwheels 17 to cause the wire ropes of one drum to be wound up while those of the other drum are being unwound. The winch 13 may be operated by hand or motor and the carriage 8 may be moved over the rails 9 either manually or by means of the motor 18.

If the bottom 4 of the settling basin 3 is arranged horizontally, the wall 7 can be moved over the entire length of the basin 3 without requiring a change in adjustment, but if a sloping bottom is used, it will be necessary to adjust the wall 7 during its motion from one end of the basin 3 to the other according to the angle of inclination of the bottom to prevent variation in the size of the gap between the lower edge of the wall 7 and the bottom 4 of the basin 3.

Owing to the great velocity and force of the water flowing through the gap, the sand is not only moved forward but thoroughly rinsed also, so that organic particles contained therein are separated and discharged through the outlet. To remove the last remnants of organic admixtures from the sand collecting in the depression or sink-hole 5 of the basin 3 and thus perfectly purify it, the bottom of the hole 5 is preferably provided with means for injecting finely distributed water under pressure or compressed air into the sand accumulation, such as the ventilator box 5a supplied with compressed air by the pipe connection 5b. To prevent the stirred up sand from entering the outlet channel 6 a sealing wall 6a adjustable as to height is arranged in front of the channel 6 and adjusted to such a height during rinsing that the whirl of sand cannot pass over it. This confining wall 6a is preferably disposed so as to permit of quick raising and lowering for the purpose of rapidly ceasing the damming of the water after rinsing to insure the removal of the washed out organic matter by the rush of the current as long as it is still in suspension.

In Fig. 2 two settling plants are arranged side by side and both are in communication by branch channels with the supply and outlet channels, the rotary door 22 serving for rendering one or the other plant inoperative.

The sand can also be advantageously removed from the hole or depression 5 by means of the grippers 23 or in any other suitable manner.

I claim:—

1. Sand settling plant in clarifying works, comprising a basin, a supply channel at one end of the basin and an outlet channel on the other end of the basin, the width of the basin being larger than the width of the two channels and the bottom of the basin being lower than the bottom of the two channels, a sink-hole on the bottom of the basin near the outlet channel, a water-retaining wall arranged in and extending across the basin and corresponding in width and shape with the cross section of the basin, the said wall leaving a small gap between its lower edge and the bottom of the basin and being movable along the basin, and means for moving the wall against the flow of the water.

2. Sand settling plant in clarifying works, comprising a basin, a supply channel at one end of the basin and an outlet channel on the other end of the basin, the width of the basin being larger than the width of the two channels and the bottom of the basin being lower than the bottom of the two channels, a sink-hole on the bottom of the basin near the outlet channel, a water-retaining wall arranged in and extending across the basin and corresponding in width and shape with the cross section of the basin but leaving a small gap between its lower edge and the bottom of the basin, the said wall being inclined relative to the bottom of the basin so as to form a funnel for the flowing water, and means for moving the wall against the flow of the water.

3. Sand settling plant in clarifying works, comprising a basin, a supply channel at one end of the basin and an outlet channel on the other end of the basin, the width of the basin being larger than the width of the two channels and the bottom of the basin being lower than the bottom of the two channels, a sink-hole on the bottom of the basin near the outlet channel, a removable water-retaining wall of greater height than the highest water level in said basin arranged in and extending across the basin and corresponding in width and shape with the cross section of the basin but leaving a small gap between its lower edge and the bottom of the basin, whereby the liquid carrying the sand can pass through the gap, whilst no liquid can pass over the top of the retaining wall, and rapidly movable sealing means arranged in front of said outlet channel.

4. Sand settling plant in clarifying works, comprising a basin, a supply channel at one end of the basin and an outlet channel on the other end of the basin, the width of the basin being larger than the width of the two channels and the bottom of the basin being lower than the bottom of the two channels, a sink-hole on the bottom of the basin near the outlet channel, a removable water-retaining wall of greater height than the highest water level in said basin arranged in and extending across the basin and corresponding in width and shape with the cross section of the basin but leaving a small gap between its lower edge and the bottom of the basin, whereby the liquid carrying the sand can pass through the gap, whilst no liquid can pass over the top of the retaining wall, and ventilating means provided on the bottom of the sink-hole.

5. A process of cleaning sand settling chambers and the like which consists in obstructing the flow of liquid therethrough and raising the level of the liquid on the upstream side of the obstruction while permitting flow of liquid at the point of obstruction immediately adjacent the bottom of the chamber to cause a local high velocity of flow at the point of obstruction and moving the obstruction in an upstream direction.

FRITZ MIEDER.